Apr. 10, 1923.

B. M. BAXTER 1,451,522

MECHANISM FOR THE RECOVERY OF PAPER STOCK

Filed Apr. 20, 1920

Inventor
Burke M. Baxter.
By Day, Oberlin & Day
Attorneys

Patented Apr. 10, 1923.

1,451,522

UNITED STATES PATENT OFFICE.

BURKE M. BAXTER, OF CLEVELAND, OHIO, ASSIGNOR TO AMERICAN REDUCTION COMPANY, OF PITTSBURGH, PENNSYLVANIA, A CORPORATION OF PENNSYLVANIA.

MECHANISM FOR THE RECOVERY OF PAPER STOCK.

Application filed April 20, 1920. Serial No. 375,214.

*To all whom it may concern:*

Be it known that I, BURKE M. BAXTER, a citizen of the United States, and a resident of Cleveland, county of Cuyahoga, and State of Ohio, have invented a new and useful Improvement in Mechanism for the Recovery of Paper Stock, of which the following is a specification, the principle of the invention being herein explained and the best mode in which I have contemplated applying that principle, so as to distinguish it from other inventions.

In view of the present scarcity of paper pulp and other materials for the manufacture of various grades of paper and board, the conservation of waste paper has become a matter of considerable importance. However, the recovery of such stock from rubbish as ordinarily collected by municipalities and other agencies is a matter of great difficulty owing to the fact that the paper found therein is intermixed with a great variety of relatively useless articles, such as tin cans, old shoes, rubbers and the like; also that the material may be in the form of newspapers, magazines, and even books, as well as pasteboard cartons, wrapping paper, corrugated board, and boxes and the like. The cost of assorting rubbish to pick out this material has rendered the recovery unduly expensive. The object of the present invention, accordingly, is to provide an apparatus whereby recovery of this material may be automatically accomplished by mechanical means with a minimum expenditure of power, and at the same time with increased expedition.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1:
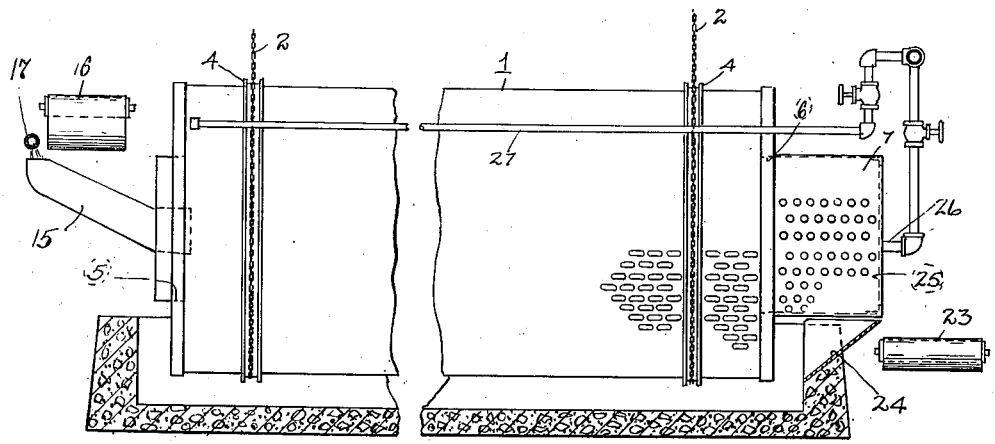
Figures 2, 3:
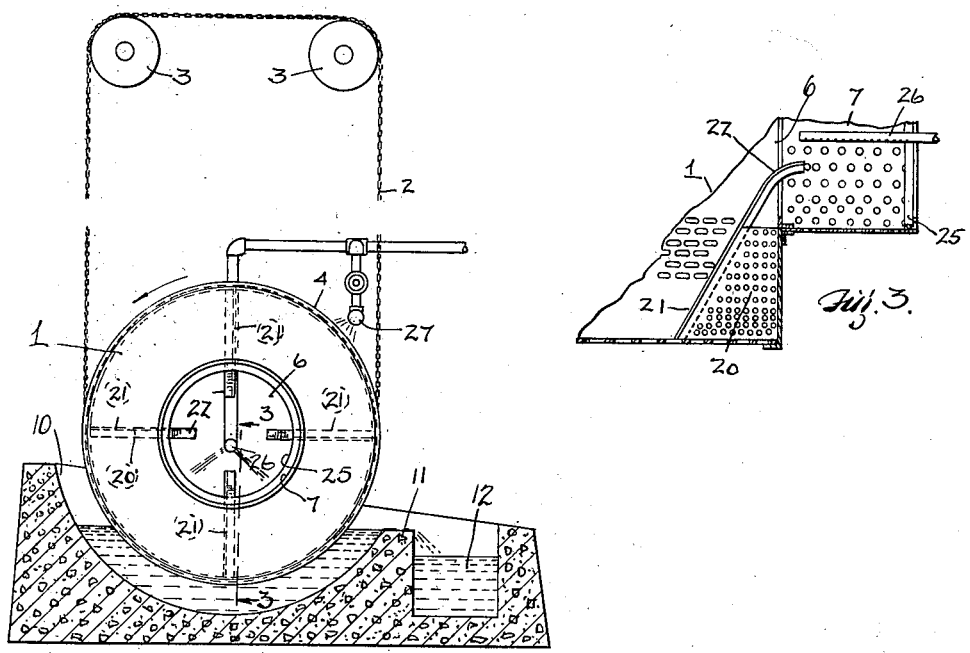

Fig. 1 is a side elevation of an apparatus embodying the present improvements; Fig. 2 is a transverse section of the same taken on the plane indicated by the line 2—2, Fig. 1; and Fig. 3 is a broken longitudinal section of a detail of the apparatus, the plane of the section being indicated by the line 3—3, Fig. 2.

The principal element in the apparatus or mechanism as illustrated in the aforesaid drawing is a perforated drum, having its axis horizontally disposed and mounted so as to be rotatable about such axis. The perforations or slots X in the walls of said cylinder are arranged parallel to the axis of said cylinder and are preferably elongated in the direction of the length thereof. The said elongated perforations or slots serve to break up the paper stock into fibre and small pieces through the rubbing action of the paper stock contained in the drum across said slots or perforations during the rotation of the drum. Preferably said drum is suspended by means of chains or cables 2 from suitable pulleys 3, one of which is power driven, said chains or cables passing around rings or channels 4 on the drum. The ends of the drum are closed as shown, so as to leave central openings 5 and 6 of approximately the relative dimensions indicated at the intake and discharge ends of the drum, respectively. Such discharge opening is somewhat larger than the intake opening, and has fitted into it a tubular extension 7, (see Fig. 1) perforated in the same fashion as the drum itself.

The drum is rotatably suspended, in the fashion just described, over an open tank or chamber 10 capable of retaining the water, or other equivalent liquid, the level of the latter being such as to extend within the drum to the height approximately as shown in Fig. 2. For example, in the case of a drum approximately 36 feet long by 9 feet in diameter, the lower side will be submerged to a depth of approximately 18 inches. The tank or chamber 10 is preferably formed out of concrete, and the one side wall 11 is lower than the other so as to provide a convenient overflow for the liquid from said tank in a laterally adjacent trough 12. From the latter the liquid may be pumped or allowed to overflow into other containers, as need not be described for the purpose in hand.

For supplying to the drum 1 the rubbish which is to be treated for the recovery of paper stock an inclined chute 15 is provided having its lower end projecting within the opening 5 at the corresponding end of said drum, said chute being arranged to receive the material in question from an endless belt conveyor 16, and a perforated pipe or suitable nozzle 17 being arranged to spray the water onto the material as it slides down the chute into the drum. The effect of such water spray will obviously assist in feeding the material into the drum.

At the discharge end of the drum I preferably mount in the interior angle formed between the cylindrical wall and the annular closure for such end, a series of triangular perforated plates 20, as shown in Fig. 3, the free inclined edges of each such plate being reinforced by means of a bar of angle iron 21. The inner ends 22 of these bars are curved to project radially into the opening 6 the flange on said bars facing in the direction of rotation which the drum is intended to have about its axis, as shown in Fig. 2. The effect of these plates 20, and of the bars 21, is to form a series of scoops, which, as the drum rotates, will pick up any solid material arriving at the discharge end of the drum, lift the same above the liquid in the tank 10 and assist in discharging such material onto the tubular extension 7 that is inset in the opening 6. The plates 20 being perforated, as well as such extension, the liquid is given ample opportunity to drain from such solid articles as they are thus discharged, and the latter thereupon are dropped onto a second endless belt conveyor 23 whereby they are removed from the scene of operation. An inclined trough 24 is mounted below the extension 7 to collect the liquid that drains through the perforations in such extension. The number of plates 20 may be varied, four having been found suitable for the conditions ordinarily encountered.

Tubular extension 7 is desirably provided with a shallow internal flange 25 adjacent its outer end to prevent the pulp mixture from overflowing, and a relatively stationary perforated pipe 26 projects within said extension so as to direct a spray of water into the articles constituting the residual material discharged therethrough. Another perforated pipe 27 extends alongside the drum, exteriorly of its cylindrical surface, as shown in Fig. 2, so as to be adapted to spray water thereon and force back into the drum particles of pulp or paper stock which might otherwise lodge in the perforations.

The operation of the apparatus just described may now be briefly indicated. The rubbish from which such major articles, as wooden boxes, wash boilers and the like, which are of no value in the recovery process, are removed, is fed into the drum through a chute 15, and at the same time thoroughly saturated or wetted by means of the stream of water from the pipe 17 such water being preferably hot. As the drum rotates the mass of material accumulated within the same is turned over and over, clinging to the further side wall of said drum, having regard to the direction of rotation and then sliding back. The result is very quickly to reduce any paper stock, in whatever form it may be present in the rubbish, to a pulp condition, any desired degree of concentration of such pulp being obtainable by a proper regulation of the supply of water down the chute 15. The natural direction of flow of the mass of material within the drum will be from the intake to the discharge end, and as the latter is reached the residuum, consisting of articles that are not capable of being thus pulped, is picked up by the successive plates 20 and discharged onto the extension 7 and finally onto the conveyor belt 23. I have found by actual tests that not only will the apparatus promptly reduce to the state of pulp loose sheets of paper of all kinds, but also cardboard boxes, corrugated board, whether in sheet or box form, as well as remove and pulp the paper labels on cans and other similar articles so as to leave the latter bright and clean when they are finally discharged. The pulp mixture escapes of course through the perforations in the drum and gradually overflows from the tank 10 into the adjacent trough 12, whence it may be removed for further concentration if desirable, although I have found that it is possible to make a pulp of sufficient concentration to permit of the immediate fabrication therefrom of sheets such as are salable to paper manufacturers.

Rags and like fibrous materials that are apt to be encountered, I have found evince a tendency to twine upon themselves and twist in a rope-like agglomerate which remains free from the other solid residue of the process and may be removed at intervals through one or the other opening in the drum's ends.

While my invention has been described with particular reference to the recovery of paper stock from rubbish, it will be obvious that the foregoing apparatus, as well as the process exemplified in its operation, may be advantageously utilized in treating paper stock from whatever source derived. For example, such apparatus will serve to reduce to pulp, waste paper of all kinds, not previously treated with water-proofing preparations, replacing to a large extent the familiar beater at present employed for this purpose. Whatever the particular use thus made of the apparatus, it permits of a material reduction in power and labor required over the process commonly employed.

I claim—

1. In mechanism of the character described, the combination with a suitable tank for containing liquid, of a drum rotatably supported with its lower portion submerged in such liquid, said drum having its cylindrical wall formed with perforations and having intake and discharge openings in its respective ends; means for feeding the material to be treated into such first-named opening; and other means adapted to automatically remove residual material through such discharge opening as said drum rotates, said last-named means including a triangular, perforated plate mounted in the interior angle formed between the cylindrical wall of said drum and the adjacent end-wall thereof, and an angle-bar reinforcing the free edge of said plate and having an end projecting into such discharge opening.

2. In mechanism of the character described, the combination with a suitable tank for containing liquid, of a drum rotatably supported with its lower portion submerged in such liquid, said drum having its cylindrical wall formed with perforations and having intake and discharge openings in its respective ends; means for feeding the material to be treated into such first-named opening; and other means adapted to automatically remove residual material through such discharge opening as said drum rotates, said last-named means including a triangular, perforated plate mounted in the interior angle formed between the cylindrical wall of said drum and the adjacent end-wall thereof, and an angle-bar reinforcing the free edge of said plate and having an end projecting into such discharge opening the flange of said bar facing in the direction of rotation of said drum.

3. In a mechanism of the character described in combination with a suitable tank for containing liquid of a drum rotatably supported and partially submerged in such liquid, the said drum having intake and discharge openings in the respective ends, in combination with means for breaking up paper stock into fibre and small pieces, including slots in the walls of said drum arranged parallel to the axis thereof.

4. In a mechanism of the character described, the combination with a suitable tank for containing liquid of a drum rotatably supported and partially submerged in such liquid, the said drum having intake and discharge openings in the respective ends, means for feeding the material to be treated into such first named opening, means for breaking up the paper stock into fibre and small pieces, including elongated slots in the walls of said drum arranged parallel to the axis thereof, and means adapted to remove residual material through the discharge opening.

5. In a mechanism of the character described, the combination with suitable tank for containing liquid of a drum rotatably supported and partially submerged in such liquid, the said drum having intake and discharge openings in its respective ends, means for feeding the material to be treated into such first named opening, means for breaking the paper stock into fibre and small pieces by reason of the rubbing action of the paper stock contained in the drum, the said means including elongated slots in the walls of said drum arranged parallel to the axis thereof, and means adapted to automatically remove residual material through the discharge openings in the drum as the drum rotates, the last named means including a triangular perforated plate mounted in the interior angle formed between the cylindrical wall of said drum and the adjacent wall thereof.

Signed by me at Cleveland, Ohio, this 12th day of April, 1920.

BURKE M. BAXTER.